US010920042B2

(12) United States Patent
Misiak et al.

(10) Patent No.: US 10,920,042 B2
(45) Date of Patent: Feb. 16, 2021

(54) METHOD FOR PREPARING A HYDROPHOBICALLY MODIFIED CLAY

(71) Applicant: HENKEL AG & CO. KGAA, Duesseldorf (DE)

(72) Inventors: Hanns Misiak, Haan (DE); Daniela Neitzke, Duesseldorf (DE); Christina Huebner, Langenfeld (DE); Hans-Georg Kinzelmann, Pulheim (DE); Ligang Zhao, Duesseldorf (DE); Josef Breu, Bayreuth (DE); Andreas Edenharter, Bayreuth (DE); Sonja Amschler, Eckersdorf (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 100 days.

(21) Appl. No.: 16/276,014

(22) Filed: Feb. 14, 2019

(65) Prior Publication Data
US 2019/0177511 A1 Jun. 13, 2019

Related U.S. Application Data

(63) Continuation of application No. PCT/EP2017/070705, filed on Aug. 16, 2017.

(30) Foreign Application Priority Data

Aug. 19, 2016 (EP) .................................... 16184955

(51) Int. Cl.
| C08K 3/34 | (2006.01) |
|---|---|
| C08K 9/04 | (2006.01) |
| C09J 175/04 | (2006.01) |
| C08L 101/00 | (2006.01) |
| C08L 75/00 | (2006.01) |
| C08G 18/48 | (2006.01) |
| C08G 18/79 | (2006.01) |
| C09J 175/08 | (2006.01) |
| C09D 7/62 | (2018.01) |
| C08G 18/06 | (2006.01) |
| C09D 175/04 | (2006.01) |
| C09J 11/04 | (2006.01) |
| C09K 3/10 | (2006.01) |

(52) U.S. Cl.
CPC ............... *C08K 9/04* (2013.01); *C08G 18/06* (2013.01); *C08G 18/4825* (2013.01); *C08G 18/792* (2013.01); *C08K 3/346* (2013.01); *C08L 75/00* (2013.01); *C08L 101/00* (2013.01); *C09D 7/62* (2018.01); *C09D 175/04* (2013.01); *C09J 11/04* (2013.01); *C09J 175/04* (2013.01); *C09J 175/08* (2013.01); *C09K 3/1021* (2013.01); *C08G 2150/00* (2013.01); *C08G 2170/00* (2013.01); *C08K 2201/008* (2013.01); *C09K 2200/0252* (2013.01); *C09K 2200/065* (2013.01)

(58) Field of Classification Search
CPC . C08K 9/04; C08K 3/346; C08G 18/06; C09J 175/04; C09J 11/04; C09D 7/62; C09D 175/04; C08L 75/04
See application file for complete search history.

(56) References Cited

U.S. PATENT DOCUMENTS

| 5,376,604 | A | * | 12/1994 | Iwasaki ................... C01B 33/44 |
|---|---|---|---|---|
| | | | | 106/287.11 |
| 6,420,466 | B1 | | 7/2002 | Haubennestel et al. |
| 6,794,445 | B2 | | 9/2004 | Reusmann et al. |
| 2007/0197711 | A1 | | 8/2007 | Ijdo et al. |

FOREIGN PATENT DOCUMENTS

| CN | 101774598 A | 7/2010 |
|---|---|---|
| CN | 103214076 A | 7/2013 |
| CN | 104558984 A | 4/2015 |
| DE | 19960411 A1 | 7/2001 |
| EP | 0150444 A2 | 8/1985 |
| EP | 0524503 A2 | 1/1993 |
| EP | 0951493 A1 | 10/1999 |
| EP | 1048681 A2 | 11/2000 |
| EP | 1341832 A2 | 9/2003 |
| EP | 1456265 | 9/2004 |
| JP | H06024732 A | 2/1994 |
| WO | 9709285 A1 | 3/1997 |
| WO | 9829466 A1 | 7/1998 |
| WO | 0248227 A2 | 6/2002 |
| WO | 03051951 A1 | 6/2003 |
| WO | 2005097861 A1 | 10/2005 |

OTHER PUBLICATIONS

Kunz, Daniel A. et al. ACS Nano, 2013, 7, 5, pp. 4275-4280.
Stoeter, M. et al. "Nanoplatelets of Sodium Hectorite Showing Aspect Ratios of ≈20 000 Superior Purity." Langmuir, ACS Publications, 29, 2013, pp. 1280-1285.
Kalo, Hussein et al. "How to maximize the aspect ratio of clay nanoplatelets." Nanoscale, 2012, 4, 5633-5639.
Robert Kunin, Ion Exchange Resins, 2nd ed. (1958, reprinted 1990).

* cited by examiner

*Primary Examiner* — Kuo Liang Peng
(74) *Attorney, Agent, or Firm* — Sun Hee Lehmann

(57) ABSTRACT

The invention relates to a method for preparing a hydrophobically modified clay, wherein the clay modifying agent corresponds to a quaternary ammonium based compound. The present invention further relates to a hydrophobically modified clay obtainable by such a method and to a suspension comprising such a clay, as well to the use of such a hydrophobically modified clay and of a suspension comprising such a hydrophobically modified clay. Furthermore, the present invention is also directed to a polymeric composition comprising a hydrophobically modified clay and/or a suspension comprising a hydrophobically modified clay.

15 Claims, No Drawings

METHOD FOR PREPARING A HYDROPHOBICALLY MODIFIED CLAY

BACKGROUND OF THE INVENTION

The invention relates to a method for preparing a hydrophobically modified clay. The present invention further relates to a hydrophobically modified clay obtainable by such a method and to a suspension comprising such a clay, as well to the use of such a hydrophobically modified clay and of a suspension comprising such a hydrophobically modified clay. Furthermore, the present invention is also directed to a polymeric composition comprising a hydrophobically modified clay and/or a suspension comprising a hydrophobically modified clay.

In polymeric compositions, such as sealants, coatings and adhesives, fillers are used in order to alter the physical properties of the respective formulation. A typical class of fillers are mineral compounds, such as silicates. In general, the aspect ratio (ratio of particle size in different dimensions, in particular ratio of the longest diameter to the shortest diameter) of filler particles is the key factor in improving the properties that fillers are imparting to a polymeric composition, which may encompass barrier functions against gases and/or fluids, and fire retardancy, as well as overall mechanical and thermal properties of the polymeric composition. The efficiency of the gas barrier effect, with regard to the correlation between mineral assay and the barrier, steeply increases with the flatness of the particles (=their aspect ratio), meaning that—at same mineral assays—increasing aspect ratios result in better gas barriers. With respect to gas barrier properties as well as overall dispersibility of the clay particles within a polymeric matrix, huge aspect ratios of several thousands are advantageous. The aspect ratios of laminated clay particles may be maximized by osmotic swelling. Osmotic swelling occurs in aqueous suspensions and may be prompted/enhanced by, for instance, introduction of lithium cations, as thereby overall hydration of the clay particle surfaces is improved. The osmotic swelling of clay minerals results in exfoliated clay particles with comparably huge aspect ratios. As for the introduction of clay minerals in polymeric compositions, it is desired that the exfoliated state of the particles is retained. However, upon transfer of exfoliated mineral clay particles from a first matrix, for instance an aqueous suspension, into a more hydrophobic matrix, such as a polymer matrix, the fully exfoliated state collapses and the formerly exfoliated particles flocculate, forming agglomerates once more. To date, fully exfoliated particles of hydrophobically modified hectorite were successfully transferred into acetonitrile by the use of quaternized dimethylaminoethyl methacrylate (D. A. Kunz et al., ACS Nano, 2013, 7, 4275-4280). In particular with respect to possible applications in adhesives, however, the labelling requirements of acetonitrile render it a comparably less favorable solvent, for which reason there is still a need for modified clay mineral particles, which allow for transfer into organic solvents other than acetonitrile, while retaining the fully exfoliated state. A solvent like acetonitrile also suffers from the disadvantage of causing formation of nitrous oxides upon combustion. Plants processing acetonitrile-based formulations, e.g. adhesives, are typically equipped with either solvent combustion or at least combustion of the exhaust air, containing solvent remnants. In case of suboptimal combustion there is also a risk of hydrogen cyanide (HCN) formation, which is a highly toxic substance. Furthermore, acetonitrile is more expensive compared to more common solvents like e.g. acetone or ethyl acetate.

Therefore, it is an object of the present invention to provide alternative compounds for the modification of the surface of various minerals, in particular laminated clay minerals, such as phyllosilicates, in particular of the hectorite-type, which allow for preparation of suspensions of said modified minerals in organic solvents other than acetonitrile.

In this regard, it has been surprisingly found by the inventors that the modification of the surface of laminated clay minerals, such as phyllosilicates, in particular those of the hectorite-type, with specific quaternary ammonium based compounds, exhibiting a certain ratio of apolar/polar substituents on the nitrogen atom as disclosed herein, allow for complete exfoliation of the mineral in various organic solvents other than acetonitrile. The resulting suspensions of exfoliated modified minerals may be used as additives for adhesive, sealant and coating compositions, which then exhibit improved gas barrier properties.

BRIEF SUMMARY OF THE INVENTION

In a first aspect, the present invention thus relates to a method for preparing hydrophobically modified clay comprising the steps of:
a) providing a clay having at least one first cation;
b) providing at least one clay modifying agent;
c) mixing the clay and the at least one clay modifying agent in an aqueous suspension over a period of time sufficient for the clay to become hydrophobically modified by the at least one clay modifying agent, wherein the at least one clay modifying agent is able to substantially replace the first cation on the clay surface;
wherein the at least one clay modifying agent comprises a compound represented by formula (I)

wherein, in formula (I),
$X^-$ represents a counter anion; and
$R^1$, $R^2$, $R^3$, and $R^4$ are independently selected from linear or branched, substituted or unsubstituted alkyl or alkenyl moieties with 1 to 50 carbon atoms and alkylether moieties of formula (II)

wherein, in formula (II), $R^5$ is H or $C_{1-6}$ alkyl, preferably H, methyl or ethyl, $R^6$ is H or $C_{1-4}$ alkyl, and n is an integer from 3 to 50, preferably 5 to 35;
wherein at least one of $R^1$, $R^2$, $R^3$, and $R^4$ represents a group of formula (II) and wherein the ratio of the number of non-hydrogen atoms of the groups of formula (II) to the number of non-hydrogen atoms of the linear or branched, substituted or unsubstituted alkyl or alkenyl moieties is 1.5 or more.

In a further aspect, the present invention relates to a hydrophobically modified clay obtainable by a method of preparation as described herein.

In another aspect, the present invention relates to a suspension comprising the hydrophobically modified clay as described herein.

In yet another aspect, the present invention further relates to the use of a hydrophobically modified clay as disclosed herein.

In a still further aspect, the present invention relates to the use of a suspension comprising the hydrophobically modified clay as described herein.

Finally, the present invention also relates to a polymeric composition comprising a hydrophobically modified clay as described herein and/or a suspension comprising the hydrophobically modified clay as described herein.

Further preferred embodiments of the invention are set out in the claims.

DETAILED DESCRIPTION OF THE INVENTION

In the present specification, the terms "a" and "an" and "at least one" are the same as the term "one or more" and can be employed interchangeably.

"One or more", as used herein, relates to at least one and comprises 1, 2, 3, 4, 5, 6, 7, 8, 9 or more of the referenced species. Similarly, "at least one" means one or more, i.e. 1, 2, 3, 4, 5, 6, 7, 8, 9 or more. "At least one", as used herein in relation to any component, refers to the number of chemically different molecules, i.e. to the number of different types of the referenced species, but not to the total number of molecules.

If reference is made herein to a molecular weight of a polymer or its components, this reference refers to the average number molecular weight $M_n$, if not explicitly stated otherwise. The number average molecular weight $M_n$ can be calculated based on end group analysis (OH numbers according to DIN 53240) or can be determined by gel permeation chromatography according to DIN 55672-1: 2007-08 with THF as the eluent. If not stated otherwise, all given molecular weights are those determined by end group analysis. The weight average molecular weight $M_w$ can be determined by GPC, as described for $M_n$.

All percentages given herein in relation to the compositions or formulations relate to weight % relative to the total weight of the respective composition or formula, if not explicitly stated otherwise.

The method for preparing hydrophobically modified clay according to the present invention comprises the following steps:

In a first step, there is provided a clay having at least one first cation. The term "at least one first cation", as used herein, is referring to a cation, which is comprised in the molecular lattice of the mineral lattice structure of the clay. For instance, the first cation may be a cation naturally occurring within the molecular lattice of the clay, such as $Ca^{2+}$, $K^+$, $Na^+$ or $Li^+$, or it may be a cation introduced into the molecular lattice of the clay by cation exchange methods known in the art, which may, for instance, encompass ion exchange resins, such as $H^+$ or other cations like $Li^+$.

In various embodiments, the at least one first cation of the clay provided in the first step of the method disclosed herein is a naturally occurring cation within the clay molecular lattice. In various other embodiments, the at least one first cation of the clay provided in the first step of the method described herein is a hydrogen atom, which at least one naturally occurring cation within the clay molecular lattice has been replaced with. The term "naturally occurring" may be referring to cations that are present within the initial structure of a mineral clay as found in nature or of a clay as synthesized.

Methods for exchanging at least one naturally occurring cation within the molecular lattice of the clay for a hydrogen atom are known in the art. For instance, suitable methods may encompass the employment of an ion exchange resin. For instance, a suitable ion exchange resin may be added to an aqueous suspension of the clay in order to exchange hydrogen ions for cations on the surface of the clay.

Ion exchange resins are generally polymeric compounds that contain positively or negatively charged functional groups that can attract an ion of opposite charge from a surrounding solution. The electrically charged groups may include, for example, sulfonic or carboxylic acid salts or quaternary ammonium salts. Polymers containing acid groups are generally classified as "acid", or "cation exchangers", because they exchange positively charged ions, such as hydrogen ions and metal ions. Polymers containing ammonium groups are generally classified as "basic", or "anion exchangers", because they exchange negatively charged ions, usually hydroxide ions or halide ions. Some non-limiting examples of ion exchange resins include styrene-divinylbenzene copolymers, methacrylic acid divinylbenzene polymers, and phenol-formaldehyde polymers. Further examples of ion exchange resins are provided in Robert Kunin, Ion Exchange Resins, 2nd ed. (1958, reprinted 1990). Preferably, a cation exchange resin such as AMBERLITEE IRN-77, which is manufactured by Rohm and Haas Co. of Philadelphia, Pa., may be used in certain embodiments of the present invention.

The amount of ion exchange resin, which is preferably added to an aqueous clay suspension in large excess depending upon batch size, is preferably from 50,000% to 100%, more preferably from 10,000% to 1,000%, and even most preferably from 8,000% to 4,000% by weight, based upon the dry weight of the clay in the aqueous dispersion. The resulting mixture is stirred for a certain time and temperature. Preferably, the aqueous suspension is stirred for a period of 2 to 24 hours, preferably 4 to 12 hours, and even more preferably 6 to 10 hours. The temperature conditions at which the aqueous suspension is stirred is preferably from 20° C. to 120° C., more preferably from 50° C. to 100° C., and most preferably from 60° C. to 80° C. The ion exchange resin is removed from the suspension, preferably through filtration or similar means.

In the context of the present invention, any clay, which is characterized by a laminated mineral structure and contains at least one first cation, may be hydrophobically modified in a method as disclosed herein. In various embodiments, the clay is a natural or synthetic layered silicate mineral. For instance, the clay may be a phyllosilicate. In various embodiments, the clay is preferably selected from the group consisting of smectite, montmorillonite, saponite, beidellite, montronite, hectorite, stevensite, vermiculite, kaolinite, halosite, magadiite, and fluorohectorite.

In various embodiments, the clay provided in the first step of the method according to the present invention is a phyllosilicate.

In various embodiments, the clay provided in the first step of the method according to the present invention preferably is hectorite.

The clay provided in the first step of the method disclosed herein may be provided in the form of an aqueous suspension.

In certain embodiments, the clay provided in the first step of the method according to the present invention is provided in the form of an aqueous suspension, wherein the clay may be either partially or completely exfoliated. Preferably, the clay is an at least partially exfoliated clay. The term "at least partially exfoliated clay", as used herein, generally refers to a clay, in which the mineral layers or tactoids have been completely or partially separated from one another, i.e. intercalation of water molecules and thereby at least partial exfoliation of the tactoids has occurred.

Methods for the preparation of aqueous suspensions of clay as described herein, wherein the clay may be either partially or completely exfoliated, are known in the art. For instance, aqueous clay suspensions may be prepared by subjecting an aqueous clay mixture to shearing forces such as by mechanical mixing to partially and/or fully exfoliate the clay. These methods include, but are not limited to, ultrasonication, megasonication, grinding/milling, high speed blending, homogenization, and the like. Although such high shearing methods may be used in the process of the present invention, these methods are not required to achieve an at least partially exfoliated state. In the various embodiments of this invention, the clay may include both exfoliated clay layers and non-exfoliated clay particles. In certain embodiments of the present invention, homogenization of the aqueous clay suspension is not required.

In a second step, at least one clay modifying agent is provided. The term "clay modifying agent", as used herein, refers to a compound, which will modify the surface of clay particles by replacing cations within the molecular lattice of the clay. Thereby, the modification of the clay is depending upon the chemical characteristics of the at least one clay modifying agent. In the context of the present invention, the structure of the clay modifying agents is selected purposefully, such that a hydrophobically modified clay may be obtained using the compounds as disclosed herein.

According to the present invention, the at least one clay modifying agent corresponds to a represented by formula (I)

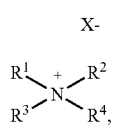

(I)

wherein, in formula (I), $X^-$ represents a counter anion, and $R^1$, $R^2$, $R^3$, and $R^4$ are independently selected from linear or branched, substituted or unsubstituted alkyl or alkenyl moieties with 1 to 50 carbon atoms and alkylether moieties of formula (II)

—(CHR$^5$CH$_2$O)$_n$R$^6$ (II)

wherein, in formula (II), $R^5$ is H or $C_{1-6}$ alkyl, preferably H, Methyl or Ethyl, $R^6$ is H or $C_{1-4}$ alkyl, and n is an integer from 3 to 50, preferably 5 to 35. According to the present invention, at least one of $R^1$, $R^2$, $R^3$, and $R^4$ in formula (I) represents a group of formula (II), and the ratio of the number of non-hydrogen atoms of the groups of formula (II) to the number of non-hydrogen atoms of the linear or branched, substituted or unsubstituted alkyl or alkenyl moieties is 1.5 or more. In the context of the present invention, said ratio will be referred to as the Po/Apo ratio.

In various embodiments, at least two of $R^1$, $R^2$, $R^3$, and $R^4$ in formula (I) independently represent a group of formula (II), and the ratio of the number of non-hydrogen atoms of the groups of formula (II) to the number of non-hydrogen atoms of the linear or branched, substituted or unsubstituted alkyl or alkenyl moieties is 1.5 or more.

In certain embodiments, the ratio of the number of non-hydrogen atoms of the group(s) of formula (II) to the number of non-hydrogen atoms of the linear or branched, substituted or unsubstituted alkyl or alkenyl moieties is 2.0 or more.

According to various embodiments, in the compounds according to formula (I), $R^1$, $R^2$, $R^3$, and $R^4$ each have a chain length of 5 to 50 non-hydrogen atoms.

In various embodiments, the moieties of formula (II) comprise ethylene oxide (EO) and/or propylene oxide (PO) units, i.e. $R^5$ is H or methyl. Said moieties may be end-capped, for example with $C_{1-4}$ alkyl, e.g. $R^6$ is methyl, or may have a terminal hydroxyl group, i.e. $R^6$ is H. Particularly preferred are polyethylene oxide units with n=5 to 15 or mixed polypropylene/polyethylene oxide units with 1 to 5 EO and 5 to 30 PO units. If mixed EO/PO moieties are used, it is preferred that these are block copolymers with the EO block arranged on the terminus and the PO block bound to the nitrogen. It is understood that while n in a given compound is an integer, it can be a decimal number in case of a population of molecules with varying chain lengths, i.e. an average value.

According to certain other embodiments, in the compounds according to formula (I), one, two or three of $R^1$, $R^2$, $R^3$, and $R^4$ represent(s) linear or branched unsubstituted alkyl chains of 1 to 30, preferably 1 to 20 carbon atoms in length, such as methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl and n-eicosanyl.

In various embodiments, $R^1$, $R^2$, $R^3$, and $R^4$ may independently be substituted with one or more hydroxyl groups.

In various embodiments, $X^-$, in formula (I), is selected from the group consisting of Br$^-$, Cl$^-$, F$^-$, CH$_3$SO$_3^-$, ClO$_4^-$, BF$_4^-$, PF$_6^-$, SbF$_6^-$, triflate anion, and tosylate anion.

For instance, a clay modifying agent having one polar side chain according to formula (II) having 40 non-hydrogen atoms (Po=40), e.g. 9 propoxylate units and one terminal methyl-capped ethoxylated unit (PO9,EO1), and three non-polar side chains each having 6 carbon atoms (Apo=18) will have a Po/Apo ratio of 2.22. A clay modifying agent having one polar side chain according to formula (II) having 132 non-hydrogen atoms (29 propoxy units and 5 ethoxy units+ methyl cap, Po=132) and three non-polar side chains each having 1 carbon atom (Apo=3) will have a Po/Apo ratio of 44.

In certain embodiments, the clay modifying agent is selected from the group consisting of:

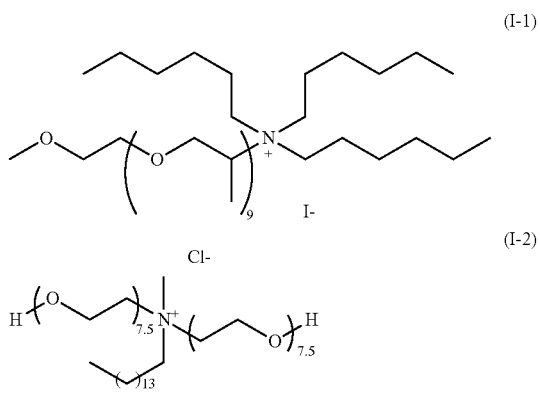

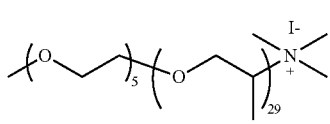
(I-3)

In various embodiments, the clay modifying agent as described above is provided in the form of an aqueous solution.

In order to obtain a hydrophobically modified clay, in a third step of the method according to the present invention, the clay as described above and the clay modifying agent as described above are mixed together. Preferably, the mixing of both components is performed in an aqueous suspension containing both the clay and the clay modifying agent. Preferably, demineralized water is used. In various embodiments, an aqueous suspension may be provided, containing the clay as described above, to which the clay modifying agent is added in order to form a suspension containing the clay and clay modifying agent. In various embodiments, the clay modifying agent may be added in pure form or in the form of an aqueous solution. In various embodiments, the order of addition of the respective components may be vice versa. In various embodiments, the ratio of clay modifying agent to clay in the aqueous suspension of the third step of the method according to the present invention corresponds to the double excess of clay modifying agent compared to the cation exchange capacity (CEC) of the clay, as determined by methods known in the art. The two components are mixed with each other in the aqueous suspension over a period of time sufficient for the clay to become hydrophobically modified by the clay modifying agent. As indicated above, the modification is the substantial replacement of a first cation with the clay modifying agent on the surface of the clay particles. In various embodiments, the mixing of the clay and the clay modifying agent is performed by agitation or stirring. In various embodiments, the mixing of the clay and the clay modifying agent is performed over a period of 1 to 48 hours, preferably 4 to 24 hours. The mixing procedure may be repeated one or more times, in order to ensure a high degree of ion replacement by the clay modifying agent. Thus, in various embodiments, after completion of one mixing cycle, the clay may be washed with demineralized water and the mixing procedure as indicated above may be repeated one or more times.

In various embodiments, the method according to the present invention further comprises a step of isolating the hydrophobically modified clay obtained in the third step of the method according to the present invention as described above. The isolation of the hydrophobically modified clay may be facilitated by initiating flocculation of the exfoliated, finely dispersed clay particles in the aqueous mixing suspension. In various embodiments, flocculation is initiated in the course of cation exchange on the surface of the clay particles by the clay modifying agent. In various other embodiments, flocculation may be initiated by transfer of the aqueous suspension mixture into one or more water miscible, organic solvents, respectively addition of the organic solvent to the aqueous suspension. Suitable examples of water miscible, organic solvents include, without limitation, butanone and tetrahydrofurane. After flocculation, the hydrophobically modified clay particles may be isolated, for instance by filtration.

In a further aspect, the present invention relates to a hydrophobically modified clay obtainable by a method of preparation as described above.

In yet another aspect, the present invention further relates to a suspension comprising the hydrophobically modified clay as described herein and at least one solvent.

In various embodiments, the above-mentioned at least one solvent is selected from water, water-miscible organic solvents and water-immiscible organic solvents.

In various embodiments, the at least one solvent is a water miscible solvent, preferably selected from the group consisting of solvents of the ketone, lactone, lactam, nitrile, nitro compound, carboxamide, urea compound, sulfoxide, sulfone, carbonate ester, ether, alcohol, primary or secondary amine, carboxylic acid, or primary or secondary amide type.

According to certain embodiments, the at least one solvent is selected from the group consisting of methanol, ethanol, acetone, butanone, ethyl acetate, and acetonitrile, preferably ethanol, acetone, butanone, and ethyl acetate. In certain other embodiments, the at least one solvent is selected from the group consisting of acetonitrile, acetone, butanone, ethanol, dioxane, and ethyl acetate. In various other embodiments, the at least one solvent is selected from the group consisting of acetone, butanone, ethanol, dioxane, and ethyl acetate.

The present invention is further directed to the use of a hydrophobically modified clay as described herein.

In various embodiments, the hydrophobically modified clay as described herein is used for the preparation of a polymeric composition.

The hydrophobic modification of the clay in a method as described herein allows for transfer of exfoliated clay particles into a polymeric matrix, without causing the exfoliated state of the clay particles to collapse. The hydrophobic nature of the surface of the clay particles prepared as described herein enables intercalation of the polymers of the polymer matrix, such that the exfoliated state of the clay is retained. Greater exfoliation of hydrophobically modified clays in polymer matrices generally leads to more enhanced properties, such as mechanic properties (e.g. tensile moduli, moduli of rupture), thermal properties (e.g. thermal conductivity), and isolating properties (e.g. gas barrier properties). For this reason, the hydrophobically modified clay according to the present invention is highly useful in the preparation of technically advantageous and superior polymeric compositions for various fields of application.

According to certain embodiments, the polymeric composition is selected from the group consisting of a coating composition, a sealant composition, and an adhesive composition.

In various embodiments, the transfer of the hydrophobically modified clay particles into a polymeric matrix encompasses the provision of a suspension comprising the hydrophobically modified clay according to the present invention, whereby said suspension comprising the hydrophobically modified clay is transferred into a polymeric matrix.

The present invention is thus further directed to the use of a suspension comprising the hydrophobically modified as described herein.

In various embodiments, the suspension comprising the hydrophobically modified clay as described herein is used for the preparation of a polymeric composition. According to certain embodiments, the polymeric composition is selected from the group consisting of a coating composition, a sealant composition, and an adhesive composition.

Furthermore, the present invention is directed to a polymeric composition comprising a hydrophobically modified clay as described herein and/or a suspension comprising the hydrophobically modified clay as described herein.

According to certain embodiments, the polymeric composition is selected from the group consisting of a coating composition, a sealant composition, and an adhesive composition.

In various other embodiments, the hydrophobically modified clay is present in an amount of 0.5 to 25 wt.-%, preferably 1 to 10 wt.-%, based on the total weight of the solid content of the polymeric composition.

In preferred embodiments, the hydrophobically modified clays or suspensions of the hydrophobically modified clays as described herein may be used as additive components for adhesive compositions, in particular polyurethane adhesive compositions. The hydrophobically modified clays as described herein may be used as additive components for one component (also referred to as 1K or 1c) or two component (also referred to as 2K or 2c) polyurethane adhesive compositions. Especially preferred polyurethane (PU) adhesive compositions may be 2K adhesive compositions. These 2K polyurethane adhesive compositions generally comprise a component (a) and a component (b), wherein the component (a) is a resin component and the component (b) is a hardener, respectively cross-linker, component.

In separated form, the two components (a) and (b) are storage-stable.

In certain embodiments, the resin component (a) comprises at least one polyol and/or at least one NCO-reactive prepolymer, and the hardener component (b) comprises at least one polyisocyanate. In certain other embodiments, however, the resin component (a) comprises at least one NCO-terminated prepolymer, and the hardener component (b) comprises at least one polyol and/or another compound with at least two NCO-reactive groups. Generally, the latter is preferred.

In such systems, the hydrophobically clay according to the present invention may be comprised in the hardener component or the resin component. In preferred embodiments, the hydrophobically modified clay may be comprised in the hardener component.

In each of the components, additional additives can be incorporated provided they do not react with the reactive groups of the other compounds during storage so as to ensure stability of the formulation.

In preferred embodiments according to the present invention, the resin component (a) comprises at least one NCO-terminated prepolymer.

Suitable NCO-terminated prepolymers may be prepared by reacting at least one polyol or at least one polyol mixture with at least one polyisocyanate, wherein the at least one polyisocyanate is used in molar excess.

The at least one polyol to be employed in the preparation of the NCO-terminated prepolymer can be selected form a broad range of commercially available products, e.g. polyetherpolyols, polyesterpolyols, oleochemical polyols, aliphatic, cycloaliphatic or aromatic polyols, OH-group containing polymeric or oligomeric compounds like polycarbonates, polybutadienes, polyacrylates or mixtures thereof.

One group of suitable polyols are polyester polyols, which can be prepared by condensation of di- or tricarboxylic acids with an excess of bi- or trifunctional alcohols. The carboxylic acids may be aliphatic, cycloaliphatic, aromatic or heterocyclic or mixtures thereof. Examples of suitable acids are aliphatic acids, like adipic acid, sebacic acid, glutaric acid, azelaic acid, suberic acid, undecanedioic acid, dodecandioic acid, 3,3-dimethylglutaric acid, hexahydrophthalic acid; aromatic acids like phthalic acid, terephthalic acid, isophthalic acid; unsaturated acids like maleic acid, fumaric acid, dimer fatty acid; tricarboxylic acids like citric acid and trimellitic acid. Examples of suitable bi- or trifunctional alcohols include, without limitation, low molecular weight alcohols like ethylene glycol, diethylene glycol, neopentyl glycol, hexanediol, butanediol, propylene glycol, glycerol or trimethylol propane, dipropylene glycol, 1,4-butanediol, 1,6-hexanediol, 1,8-octanediol, 1,10-dicanediol, 1,12-dodecanediol, 1,4-hydroxymethyl cyclohexane, 2-methyl propane-1,3-diol, butane-1,2,4-triol, triethylene glycol, tetraethylene glycol, polyethylene glycol, dipropylene glycol, polypropylene glycol, dibutylene glycol and polybutylene glycol, as well as glycerol, trimethylolpropane, or mixtures of the aforementioned.

Another group of suitable polyester polyols are based on ε-caprolactone, also called polycaprolactones, or on hydroxycarboxylic acids, for example ω-hydroxycaproic acid. Such polyols, contain at least two OH groups, preferably terminal OH groups or polymers of tetrahydrofurane (THF).

Another group of polyester polyols, which are useful in the invention, are the so called oleochemical polyols. Such polyester polyols can be prepared, for example, by complete ring-opening of epoxidized triglycerides of a fat mixture, which comprises at least partly olefinically unsaturated fatty acids with one or more alcohols having 1 to 12 alcohols, and subsequent partial transesterification of the triglyceride derivatives to give alkyl ester polyols having 1 to 12 C atoms in the alkyl radical. Another group of such preferably suitable polyols based on natural products are dimer diols, as well as castor oil and derivatives thereof.

Another group of polyols are polyacetals. Polyacetals are understood to be compounds obtainable by reacting glycols, for example diethylene glycol or hexanediol or mixtures thereof, with formaldehyde. Polyacetals suitable for the purposes of the invention may also be obtained by polymerizing cyclic acetals. Another group of polyols are polycarbonates. Polycarbonates may be obtained, for example, by reacting diols, such as propylene glycol, butane-1,4-diol or hexane-1,6-diol, diethylene glycol, triethylene glycol or tetraethylene glycol or mixtures of two or more thereof, with diaryl carbonates, for example diphenyl carbonate, or phosgene.

Also suitable for use in the invention are hydroxyfunctional polybutadienes, known by the commercial name of Poly-bd®.

Polycarbonate polyols may be prepared by reacting diols, such as propylene glycol, 1,4-butanediol, or 1,6-hexanediol, diethylene glycol, triethylene glycol, or tetraethyleneglycol, or mixtures thereof with diaryl carbonates, for instance diphenyl carbonates, or phosgene.

Other suitable polyol components are polyether polyols, which are the reaction products of low molecular weight polyhydric alcohols with alkylene oxides. The alkylene oxides preferably contain 2 to 4 carbon atoms. Suitable reaction products of the type in question are, for example, the reaction products of ethylene glycol, propylene glycol, the isomeric butane diols, hexane diols or 4,4'-dihydroxydiphenyl propane with ethylene oxide, propylene oxide or butylene oxide or mixtures of two or more thereof. The reaction products of polyhydric alcohols, such as glycerol, trimethylol ethane or trimethylol propane, pentaerythritol or sugar alcohols or mixtures of two or more thereof, with the alkylene oxides mentioned to form polyether polyols are also suitable. Such polyether polyols are available in different molecular weight, as compositions, as homopolymers or statistical or blockcopolymer. Another group of polyether polyols are polytetramethylenglycoles, which can be prepared by polymerization of tetrahydrofuran.

Also suitable are polyetherglycols with a low molecular weight of less than 500 g/mol (number average molecular weight $M_n$).

Other examples of low molecular weight polyols include low molecular weight diols and triols, for instance $C_2$ to $C_{20}$ diols, like ethylene glycol, propylene glycol, 1,2-butandiol-1,2 or 1,4-butanediol, 1,5-petanediol, 1,6-hexanediol, 1,8-octanediol, 1,12-dodecandiol, dimeric fatty acid alcohols or higher homologuous diols or their isomers. Additionally polyols with more than 3 functional groups can be used, like glycerol, trimethylol ethane, pentaerythrite and/or trimethylol propane, or higher functional alcohols like sugar alcohols.

The composition may further comprise polyols that are hydroxy-functionalized polymers, for example hydroxy-functionalized siloxanes. Exemplary siloxanes that may be used are hydroxy-functionalized polydimethylsiloxanes, in particular in liquid form, such as those commercially available under the name Tegomer® H—Si 2311 (Evonik, Germany) having a number average molecular weight $M_n$ of about 2,200 g/mol. Suitable polydimethylsiloxane (PDMS) polyols are, for example, described in U.S. Pat. No. 6,794,445 B2. They may be used in amounts of up to 60 wt.-% based on the total weight of the polyols used and typically have low $T_g$ values, for example in the range of from −150 to −100° C.

The number average molecular weight $M_n$ of the polyols employed in the synthesis of the NCO-terminated prepolymer preferably is within the range of 320 to 20,000 g/mol, in particular 330 to 4500 g/mol. The nominal functionality may be in the range of 2 to 4.5. Preferably, the PU prepolymer has a polyether/polyester backbone.

For the preparation of the resin component (a), one or more of the aforementioned polyols may be reacted with at least one polyisocyanate in order to form the NCO-terminated prepolymer. The at least one polyisocyanate is used in molar excess relative to the hydroxyl groups of all polyols present in the reaction mixture. In certain embodiments, the NCO:OH ratio of the NCO-reactive polyurethane prepolymer is 1:1 to 1.8:1, preferably 1:1 to 1.6:1, in particular 1.05:1 to 1.5:1.

Suitable polyisocyanates to be used for the preparation of the NCO-terminated prepolymer are known the art and may include monomeric isocyanates, which contain two or three NCO groups. For instance, they include well-known aliphatic, cyclo-aliphatic or aromatic monomeric diisocyanates. Preferably, isocyanates are selected with a molecular weight from 160 g/mol to 500 g/mol, for example aromatic polyisocyanates, for example the isomers of diphenylmethanediisocyanate (MDI), such as 4,4'-diphenylmethanediisocyanate (4,4'-MDI), 2,2'-diphenylmethane diisocyanate (2,2'-MDI), 2,4'-diphenylmethanediisocyanate (2,4'-MDI); the isomers of phenylenediisocyanate, such as 1,3-phenylenediisocyanate, 1,4-phenylenediisocyanate; naphthalene-1,5-diisocyanate (NDI), the isomers of toluenediisocyanate (TDI), such as 2,4-TDI and 2,6-TDI; m- and p-tetramethyl xylylene diisocyanate (TMXDI), m- and p-xylylenediisocyanate (XDI), 3,3'-dimethyldiphenyl-4,4'-diisocyanate (TODD, toluene diisocyanate, naphthalene, di- and tetraalkyl diphenylmethane diisocyanate, 4,4'-dibenzyl diisocyanate, and combinations thereof.

Aliphatic and cyclo-aliphatic isocyanates such as ethylene diisocyanate, dodecane diisocyanate, dimer fatty acid diisocyanate, 4,4'-dibenzyldiisocyanate, 1,6-diisocyanato-2,2,4-trimethylhexane, butane-1,4-diisocyanate, hexane-1,6-diisocyanate (HDI), tetramethoxybutane-1,4-diisocyanate, 1,12-diisocyanato-dodecane, 4,4'-dicyclohexylmethanediisocyanate, 1,3-cyclohexane or 1,4-cyclohexane diisocyanate, 1-methyl-2,4-diisocyanato-cyclohexane, 1-isocyanatomethyl-3-isocyanato-1,5,5-trimethylcyclohexane (isophorone diisocyanate, IPDI), hydrogenated or partly hydrogenated MDI ([H]12MDI (hydrogenated) or [H]6MDI (partly hydrogenated), and combinations thereof can also be used.

It is also possible to include at least partly oligomeric diisocyanates such as allophanate, carbodiimide, isocyanurate, biuret condensation products from diisocyanates, e.g., from HDI, MDI, IPDI or other isocyanates. Polymeric MDI can also be employed. Mixtures of aliphatic or aromatic isocyanates can be used. More preferably aromatic diisocyanates may be used.

In certain embodiments, the at least one NCO-terminated prepolymer of the resin component (a) has an number average molecular weight $M_n$ in the range of 1,500 to 100,000, preferably 2,000 to 50,000 g/mol. Typically, the resulting prepolymers have a NCO-content of 5-20 wt.-%, and a nominal average functionality of 2 to 3.

Examples of suitable NCO-terminated prepolymers are disclosed in EP-A951493, EP-A1341832, EP-A150444, EP-A1456265, and WO2005/097861.

Further, the adhesive composition according to the present invention comprises a hardener component (b). Suitable hardener components are known in the art. In the case of an NCO-terminated prepolymer based resin component, typically polyol compounds are employed in the hardener component. According to preferred embodiments of the present invention, the hardener component (b) comprises at least one polyol. The polyols may be selected from those that have been disclosed in connection with the prepolymers above.

Generally, while the above has been disclosed by reference to NCO-terminated prepolymers, it is understood that by changing the molar ratios of the described reactants in the prepolymer synthesis, OH-terminated prepolymers can be generated. Accordingly, in such embodiments, the same compounds described above may be used. In still further embodiments, the polyols disclosed above may be used as such or in combination with OH-terminated prepolymers as the resin component. The hardener would then in both cases comprise polyisocyanates.

In addition, the adhesive according to the invention may contain other auxiliary materials, which are preferably admixed wholly or partially with the resin component. Auxiliaries are substances, which are generally added in small quantities in order to modify the properties of the adhesive in a desired direction, for example viscosity, wetting behavior, stability, rate of reaction, or storage life. Such additives for the improvement of special properties are for example antifoam agents, wetting agents or surfactants, like stearates, silicone oil and addition products of ethylene oxide or propylene oxide with fatty alcohols; UV stabilizers antioxidants, like sterically hindered phenols, thioethers, substituted benzotriazoles or from the HALS type; additional adhesion promoters, for example silanes containing hydrolysable groups like hydroxy functional, (meth)acryloxy functional, amino functional or epoxyfunctional trialkoxysilanes, including methoxy, ethoxy, propoxy or butoxy groups; and fire retardants.

To increase the reactivity of the adhesive for crosslinking, the adhesive may optionally contain catalysts. Suitable catalysts, which can be employed according to the invention are, in particular, the organometal and/or aminic catalysts. Examples include titanates like tetrabutyl titanate or tetrapropyl titanate, dibutyl tin dilaulate (DBTL), dibutyl tin diacetate, tin octoate, dibutyl tin oxide, chelated metals, like Zr-acetylacetonate, Ti-acetylacetonate, Fe-acetylacetonate, amino compounds like triethylenetetramin, triethylenediamin diethylaminopropylamin, morpholin, N-methylmorpholin, diazabicyclo-[5,4,0]-undecen-7 (DBU), cyclohexylamin, 2-ethyl-4-methylimidazole. Catalysts are incorporated preferably in the hardener component.

Another group of additives are tackifying resins. Resins are known in different composition and types as synthetic resin or as natural resin. Examples for such resins are abietic acid, abietic acid esters, terpene resins, terpene/phenol resins, poly-α-methylstyrene or aliphatic, aromatic or aromatic/aliphatic hydrocarbon resins or coumarone/indene resins.

Optionally, the adhesive may contain pigments or fillers. Such additives can be used to modify specific properties of the adhesive. Examples are oxides, silicates, sulfates, phosphates or carbonates of Ti, Zr, Al, Fe, Mg, Ca, Ba or Zn, such as natural, ground chalk, precipitated chalk, barytes, talcum, mica, carbon black, titanium dioxide, iron oxides, aluminum oxide, zinc oxide, zinc sulfate or silicon dioxide. Water-absorbing powders, for example zeolite, may also be present as a filler. The fillers should be present in finely divided form, for example of 1 to 200 μm, in particular up to 50 μm, in size, but they may also be nano-scale pigments.

The composition may further contain silicon dioxide. Examples include treated silicas, precipitated silica, untreated silica especially pyrogenic silica or fumed silica is useful.

The composition may further include additional polymers containing a plurality of carboxylic acid groups and/or hydroxyl groups. As this compound can react with isocyanates it is typically included in the hardener component (b). Such components can be selected for examples from polycarboxylic polyhydroxy acid amides, polycarboxylic acid amides, and modified polyhydroxy ureas. Such polymers are known as physically thixotropy agents and are commercially available. They are disclosed for examples in U.S. Pat. No. 6,420,466 or EP1048681.

In principle, the different additives and auxiliaries can be included in each of the components. But it is useful to select such additives, which do not react with the other compounds of component (a) or (b). In specific embodiments, the catalyst is added in component (b).

Methods for the preparation of both the resin component (a) and the hardener component (b) are known in the art. The two components are stored separately until use. For use, the resin and the hardener components are mixed together in a manner known per se. After mixing of the resin component (a) with the hardener component (b), the ratio of the isocyanate groups present in the adhesive composition to the OH groups present in the adhesive composition is generally in the range of equivalence, it being convenient to provide a slight excess of isocyanate groups with regard to moisture present on the surface. The NCO/OH ratio should amount to between 0.90:1 and 1.5:1, in particular 1.0:1 to 1.3:1.

The polyurethane adhesives of the invention are liquid at application temperatures. It is preferred that the polyurethane adhesives of the invention are liquid at room temperature. In various embodiments, the adhesive compositions according to the present invention have a viscosity of 500 to 100,000, especially 1,000 to 20,000 mPas at a temperature of 40° C., as determined according to DIN ISO 2555 (Brookfield viscometer RVT, spindle No. 4, 25° C.; 5 rpm). The adhesives described herein may contain one or more solvents or may be solvent-free. Suitable solvents known to those skilled in the art, in particular, esters, ketones, halogenated hydrocarbons, alkanes, alkenes and aromatic hydrocarbons. Particular examples of suitable solvents are methylene chloride, trichlorethylene, toluene, xylene, butyl acetate, amyl acetate, isobutyl acetate, methyl isobutyl ketone, methoxybutyl acetate, cyclohexane, cyclohexanone, dichlorobenzene, diethyl ketone, di-isobutyl ketone, dioxane, ethyl acetate, ethylene glycol monobutyl ether, ethylene glycol monoethyl, 2-ethylhexyl acetate, glycol diacetate, heptane, hexane, isobutyl acetate, isooctane, isopropyl acetate, methyl ethyl ketone, tetrahydrofuran or tetrachlorethylene, or mixtures of two or more of the solvents mentioned. In preferred embodiments, the polyurethane adhesive composition according to the present invention is free of solvents.

The adhesives can be applied to the substrate by all known techniques, including without limitation, spraying, painting, dip-coating, spin-coating, printing, coating by means of a roll or nip roller, blade dispensing, box dispensing and the like.

Thus, another embodiment of the invention is method of use of the polyurethane adhesive composition according to the present invention. In various embodiments, such a method encompasses a process of applying the adhesive composition to the surface of a substrate, whereby the adhesive is polyurethane adhesive composition as described above. In the process according to the invention, the two components (a) and (b) of the adhesive are mixed immediately before application. The adhesive composition is subsequently applied to the surface of the substrate.

It is understood that all embodiments disclosed herein in relation to the methods are similarly applicable to the disclosed dispersions, compositions, and uses and vice versa.

The following examples are given to illustrate the present invention. Because these examples are given for illustrative purposes only, the invention should not be deemed limited thereto.

EXAMPLES

Example 1

Various surface modifying agents have been investigated in order to transfer the exfoliated hectorite from an aqueous matrix into an organic matrix.

It was found that surface modifying agents having a Po/Apo-ratio of about >1.5 facilitate the transfer to solvents other than just acetonitrile (MeCN), which means they form a stable (non-sedimenting) suspension. The Po/Apo-ratio is the number of non-hydrogen atoms of all polar substituents divided by the number of non-hydrogen atoms of the hydrocarbon substituents on the nitrogen atom of the modifying agent. Results obtained with respect to formulation properties of various surface-modified hectorite minerals are indicated in table 1. The column "Positive Indication" shows in which organic solvents stable suspensions can be obtained. The column "Compound" shows the structure of the modifying agent attached to the surface of the hectorite mineral.

TABLE 1

| Compound | Positive Indication | Po/Apo-ratio |
|---|---|---|
| 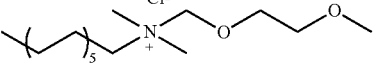<br>Dodecyl methoxyethoxymethyl dimethyl ammoniumchloride | — | 0.43 |
| 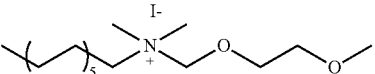<br>Dodecyl methoxyethoxymethyl dimethyl ammoniumiodide | — | 0.43 |
| 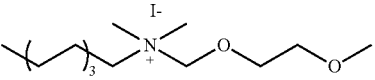<br>Octyl methoxyethoxymethyl dimethyl ammoniumiodide | MeCN | 0.6 |
| 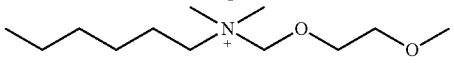<br>Hexyl methoxyethoxymethyl dimethyl ammoniumiodide | MeCN | 0.75 |
| 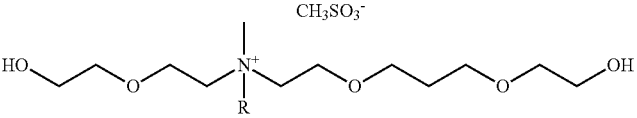<br>R = $C_{14}H_{29}$<br>Quart. ammonium methylsulfate, based on Rewoquat CPEM (Evonik) | — | 1.07 |
| 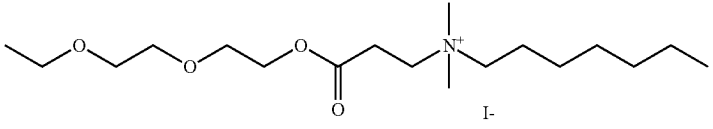<br>Ethoxyethoxyethoxycarbonylethyl hydroxyethyl heptyl dimethyl ammoniumiodide | MeCN | 1.44 |
| 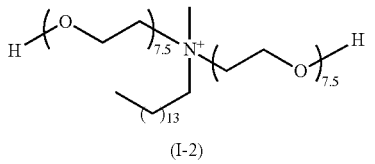<br>(I-2)<br>Quart. ammonium chloride, based on methylated Tomamine QC-15 (Air products) | MeCN, acetone, butanone, ethanol | 2.81 |
| 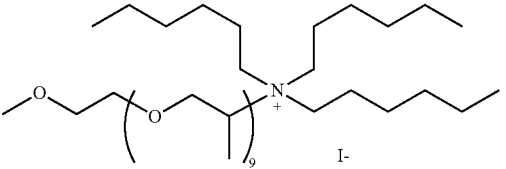<br>(I-1)<br>Methoxyethoxy nonapropylenglycol trihexyl ammoniumiodide | MeCN, acetone, butanone | 2.22 |

TABLE 1-continued

| Compound | Positive Indication | Po/Apo-ratio |
|---|---|---|
| 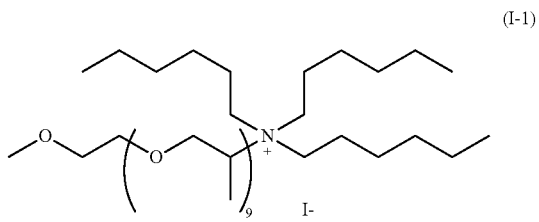<br>(I-3)<br>Trimethyl-Jeffamine M 2005 iodide<br>(Huntsman) | MeCN, acetone, dioxane, ethanol, ethyl acetate | 44 |

Example 2

Another aspect of the present invention is shown in table 2. Reactive two-component polyurethane adhesives have been formulated and plastic film laminates (see column "Structure") were prepared with it. After 10 d of cure at room temperature, the oxygen barrier (column "OTR") and peel strength were evaluated. The column "Mineral Assay" refers to the mass of modified hectorite related to the total solid content of the respective formulation.

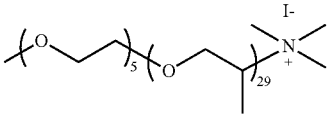

TABLE 2

| Remark | Adhesive | Solv. | Mineral assay [%] | Str. | Structure of laminate | Dispensing weight (dry) [g/sqm] | OTR (at 75% r.h.) [ccm/(d · sqm)] at 1 bar | Peel strength [N/15 mm] |
|---|---|---|---|---|---|---|---|---|
| Contr. | 2K PU/Polyester polyol hardener* | EtAc | 0.0 | n.a. | PET (12 µm)/cPP (40 µm) | 10 | 88.0 | 3.8 |
| Ex. 1 | 2K PU/Polyester polyol hardener* | EtAc | 2.2 | (I-3) | PET (12 µm)/cPP (40 µm) | 10 | 46.0 | 0.2 |
| Contr. | Polyol/aliphatic polyisocyanate** | Acetone | 0.0 | n.a. | PET (36 µm)/cPP (40 µm) | 40 | 32.0 | 3.5 |
| Ex. 2 | Polyol/aliphatic polyisocyanate** | Acetone | 2.3 | (I-2) | PET (36 µm)/cPP (40 µm) | 40 | 19.0 | 1.0 |

*isocyanate component: LOCTITE LIOFOL LA7780 (Henkel); polyol component: LOCTITE LIOFOL LA 6080 (Henkel)
**isocyanate component: Desomodur N 3600 (Covestro, formerly Bayer MaterialScience); polyol component: Voranol 1010 L (Dow Chemical)

Until recently, formulations containing the herein described surface modified mineral could only be formulated in acetonitrile and only be used as a coating. The herein presented formulation is much less toxic (see: column "Solvent"), and application as an adhesive is possible (see: column "Peel strength". In addition to adhesive properties, it is demonstrated that such formulations have gas barrier properties as well. This in, in particular, is important in case of adhesives used for flexible packaging (laminating adhesives). Laminating adhesives, until recently, lack the property of gas barrier.

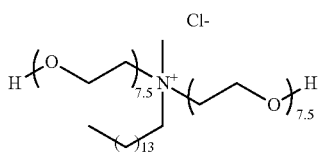

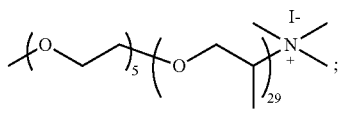

The invention claimed is:

1. A method for preparing hydrophobically modified clay comprising the steps of:
   a) providing a clay having at least one first cation;
   b) providing at least one clay modifying agent selected from the group consisting of:
   c) mixing the clay and the at least one clay modifying agent in an aqueous suspension over a period of time sufficient for the clay to become hydrophobically modified by the at least one clay modifying agent, wherein the at least one clay modifying agent is able to substantially replace the first cation on the clay surface;
   wherein the at least one clay modifying agent comprises a compound represented by formula (I)

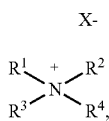

(I)

wherein, in formula (I),

X⁻ represents a counter anion; and

R¹, R², R³, and R⁴ are independently selected from linear or branched, substituted or unsubstituted alkyl or alkenyl moieties with 1 to 50 carbon atoms and alkylether moieties of formula (II)

—(CHR⁵CH₂O)nR⁶ (II)

wherein, in formula (II), R⁵ is H, methyl or ethyl, R⁶ is H or C$_{1-4}$ alkyl, and n is an integer from 3 to 50, wherein at least one of R¹, R², R³, and R⁴ represents a group of formula (II), and wherein the ratio of the number of non-hydrogen atoms of the groups of formula (II) to the number of non-hydrogen atoms of the linear or branched, substituted or unsubstituted alkyl or alkenyl moieties is 1.5 or more.

2. The method according to claim 1, wherein R¹, R², R³, and R⁴ may independently be substituted with one or more hydroxyl groups.

3. The method according to claim 1, wherein, in formula (I), one, two or three of R¹, R², R³, and R⁴ represent(s) methyl.

4. The method according to claim 1, wherein R¹, R², R³, and R⁴ each have a chain length of 5 to 50 non-hydrogen atoms.

5. The method according to claim 1, wherein X⁻ is selected from the group consisting of Br⁻, Cl⁻, F⁻, CH₃SO₃⁻, ClO₄⁻, BF₄⁻, PF₆⁻, SbF₆⁻, triflate anion, and tosylate anion.

6. The method according to claim 1, wherein the ratio of the number of atoms of the groups of formula (II) to the number of atoms of the linear or branched, substituted or unsubstituted alkyl or alkenyl moieties is 2 or more.

7. The method according to claim 1, wherein the clay of step a) is selected from the group consisting of smectite, montmorillonite, saponite, beidellite, montronite, hectorite, stevensite, vermiculite, kaolinite, hallosite, magadiite, and fluorohectorite.

8. The method according to claim 7, wherein the clay of step a) is hectorite.

9. The method according to claim 1, wherein:

(i) the clay in step a) is provided in the form of an aqueous suspension; and/or (ii) the clay modifying agent in step b) is provided in the form of an aqueous solution; and/or (iii) the mixing in step c) is performed by agitation or stirring; and/or (iv) the first cation of the clay in step a) is a naturally occurring cation within the clay molecular lattice or a hydrogen atom, which at least one naturally occurring cation within the clay molecular lattice has been replaced with the at least one clay modifying agent; and/or (v) the method further comprises the step of d) isolating the hydrophobically modified clay obtained in step c).

10. A suspension comprising the hydrophobically modified clay according to claim 1 and at least one solvent.

11. A polymeric composition comprising the suspension comprising the hydrophobically modified clay according to claim 10.

12. The polymeric composition according to claim 11, wherein the polymeric composition is selected from the group consisting of a coating composition, a sealant composition, and an adhesive composition.

13. The polymeric composition according to claim 11, wherein the polymeric composition is a one component or two component polyurethane adhesive composition.

14. A polymeric composition comprising a hydrophobically modified clay prepared by, d) providing a clay having at least one first cation;

e) providing at least one clay modifying agent;

f) mixing the clay and the at least one clay modifying agent in an aqueous suspension over a period of time sufficient for the clay to become hydrophobically modified by the at least one clay modifying agent, wherein the at least one clay modifying agent is able to substantially replace the first cation on the clay surface;

wherein the at least one clay modifying agent comprises a compound represented by formula (I)

(I)

wherein, in formula (I),

X⁻ represents a counter anion; and

R¹, R², R³, and R⁴ are independently selected from linear or branched, substituted or unsubstituted alkyl or alkenyl moieties with 1 to 50 carbon atoms and alkylether moieties of formula (II)

—(CHR⁵CH2O)nR⁶ (II)

wherein, in formula (II), R⁵ is H, methyl or ethyl, R⁶ is H or C$_{1-4}$ alkyl, and n is an integer from 3 to 50, wherein at least one of R¹, R², R³, and R⁴ represents a group of formula (II), and wherein the ratio of the number of non-hydrogen atoms of the groups of formula (II) to the number of non-hydrogen atoms of the linear or branched, substituted or unsubstituted alkyl or alkenyl moieties is 1.5 or more, wherein the polymeric composition is a one component or two component polyurethane adhesive composition.

15. The polymeric composition according to claim 14, wherein the polymeric composition is selected from the group consisting of a coating composition, a sealant composition, and an adhesive composition.

* * * * *

UNITED STATES PATENT AND TRADEMARK OFFICE
CERTIFICATE OF CORRECTION

PATENT NO. : 10,920,042 B2
APPLICATION NO. : 16/276014
DATED : February 16, 2021
INVENTOR(S) : Hanns Misiak et al.

It is certified that error appears in the above-identified patent and that said Letters Patent is hereby corrected as shown below:

In the Specification

Column 6 Line 35 change "Br-, Cl-, F-, CH3SCO3-, ClO4-, BF4-, PF6-, SbF6-" to
-- Br-, Cl-, F-, I-, CH3SCO3-, ClO4-, BF4-, PF6-, SbF6- --.

Column 11 Line 65 change "3,3'-dimethyldiphenyl-4,4'-diisocyanate (TODD" to
-- 3,3'-dimethyldiphenyl-4,4'-diisocyanate (TODI) --.

Column 13 Line 11 change "diazabicyclo-[5,4,0]-undecen-7 (DBU)" to
-- 1,8-diazabicyclo-[5,4,0]-undecen-7 (DBU) --.

In the Claims

Column 19 Line 33 Claim 5 change "Br-, Cl-, F-, CH3SCO3-, ClO4-, BF4-, PF6-, SbF6-" to
-- Br-, Cl-, F-, I-, CH3SCO3-, ClO4-, BF4-, PF6-, SbF6- --.

Signed and Sealed this
Second Day of November, 2021

Drew Hirshfeld
*Performing the Functions and Duties of the
Under Secretary of Commerce for Intellectual Property and
Director of the United States Patent and Trademark Office*